United States Patent [19]

Higuchi et al.

[11] Patent Number: 4,731,301
[45] Date of Patent: Mar. 15, 1988

[54] TINNED STEEL SHEET HAVING A HIGH DEGREE OF CORROSION RESISTANCE AND A METHOD OF PRODUCING THE SAME

[75] Inventors: Seijun Higuchi; Yashichi Oyagi; Tomonari Oga; Toshinori Mizuguchi; Senkichi Tsujimura; Toshinori Katayama; Fumio Yamamoto; Kenichi Asakawa, all of Kitakyusyushi, Japan

[73] Assignee: Nippon Steel Corporation, Tokyo, Japan

[21] Appl. No.: 811,761

[22] Filed: Dec. 20, 1985

[30] Foreign Application Priority Data

Jul. 23, 1985 [JP] Japan .................. 60-162592
Aug. 1, 1985 [JP] Japan .................. 60-170502

[51] Int. Cl.$^4$ ............................................ B32B 15/18
[52] U.S. Cl. ...................................... 428/648; 428/679
[58] Field of Search ............... 428/648, 679, 684, 935; 220/62, DIG. 11; 204/40, 54 R

[56] References Cited

U.S. PATENT DOCUMENTS

| | | | |
|---|---|---|---|
| 2,393,528 | 1/1946 | Goss et al. | 428/648 |
| 3,077,421 | 2/1963 | Budininkes | 428/648 |
| 3,326,646 | 6/1967 | Notman | 428/648 |
| 3,367,751 | 2/1968 | Halley | 428/648 |
| 3,445,351 | 5/1969 | Swalheim et al. | 428/648 |
| 3,978,803 | 9/1976 | Asano et al. | 428/648 |
| 4,104,135 | 8/1978 | Fujimoki et al. | 428/648 |
| 4,442,181 | 4/1984 | Saito et al. | 428/648 |
| 4,468,292 | 8/1984 | Ban et al. | 428/648 |
| 4,601,957 | 7/1986 | Fujimoto et al. | 428/648 |

FOREIGN PATENT DOCUMENTS

| | | | |
|---|---|---|---|
| 35748 | 4/1981 | Japan | 428/648 |
| 23091 | 6/1982 | Japan . | |
| 205495 | 11/1984 | Japan | 428/648 |
| 5884 | 12/1985 | Japan . | |

OTHER PUBLICATIONS

"Tin and Its Alloys and Compounds", Barry et al., Tin Plate, Ellis Horwood Limited, 1983, pp. 175–196.
"Rust Resistant Steel Plate", Okada et al., Chemical Abstracts, 79: 148685d, Jul. 1973.
"Aluminum-Killed Steel Plate for Hand Plating", Mutsudo et al., Chemical Abstracts 86: 109887w, Nov. 1976.

Primary Examiner—John J. Zimmerman
Attorney, Agent, or Firm—Wenderoth, Lind & Ponack

[57] ABSTRACT

Coated steel sheet of high corrosion resistance comprises a sheet of steel containing not more than 0.1% by weight of carbon, 0.005 to 0.08% by weight of soluble aluminum and 0.2 to 20% by weight of chromium, the balance being iron and unavoidable impurities. The steel carries a nickel or nickel alloy layer formed on at least one surface thereof and having a thickness of 0.001 to 1.5 microns and a layer of tin formed on the nickel or nickel alloy layer and having a thickness of at least 0.05 micron. A method of producing it is also disclosed.

14 Claims, 6 Drawing Figures

1. Welded joint
2. Testing solution

TINNED STEEL SHEET HAVING A HIGH DEGREE OF CORROSION RESISTANCE AND A METHOD OF PRODUCING THE SAME

BACKGROUND OF THE INVENTION

1. Field of the Invention

This invention relates to tinned steel sheet of high corrosion resistance having only a very small amount of iron dissolved through the edges, or any defective portion of its coating in a corrosive environment and a method of producing the same.

2. Description of the Prior Art

Tinplate has long been used for making various kinds of vessels because of its excellent appearance, corrosion resistance, workability, paintability and solderability. It, however, has a number of drawbacks, too. The biggest drawback is its very high cost of manufacture which is due to a sharp rise in the price of tin. A reduction in the amount of tin employed has been proposed to lower the cost of tinplate production, but has given rise to a lowering in the corrosion resistance of tinplate.

In order to solve this problem, there has been developed tinplate having a layer of nickel under a layer of tin, as disclosed, for example, in Japanese Laid-Open Patent Specifications Nos. 23091/1982 and 5884/1985. According to the teachings of these specifications, the combination of the undercoat and the tin layer and the formation of a uniform and dense alloy layer which is possible due to the presence of the undercoat enable a reduction in the amount of exposed iron or steel and thereby the production of tinplate of improved corrosion resistance. Tinplate of this nature is effectively used for making some kinds of vessels, but cannot be said to be fully satisfactory in corrosion resistance.

An attempt has also been made to use tinplate for making a vessel for alcoholic fuel. No satisfactory results, however, appear to have been obtained, since the pinholes which are formed in a coated layer on tinplate during its formation into a vessel gives rise to rusting or pitting corrosion. There is a strong demand for the tinplate which is highly resistant to pitting corrosion in any such defective portion of coating on the inner or outer surface of a fuel tank which may be used for holding alcoholic fuel, as well as gasoline.

Various types of cans have come to be manufactured for holding various kinds of substances and also for meeting the consumers' demand for products of higher quality. It is also necessary to use tinplate having a reduced thickness to lower the cost of vessel manufacture. In all of these cases, it is essential to improve the corrosion resistance of the vessels.

There is also an increasing demand for complexly shaped cans, such as cans of the necked-in type. They include heavily deformed portions of which a high degree of corrosion resistance is required, especially if they are used for holding a substance containing $Cl^-$ ions.

There are also known cans of the easy-to-open type having a tab which can be pulled to remove a lid portion for opening the can. In order to cope with a demand for cans of such type which are easier to open, it is usual to reduce the thickness of the lid, particularly its score portion. Improved corrosion resistance is required of these cans, especially in the score portion having exposed iron on the outer surface of the lid and the heavily deformed portion on the inner surface thereof. If the tab is formed from iron, it is necessary to ensure the corrosion resistance of its edge, particularly its rust resistance. Improved rust resistance is also required of a crown for a bottle.

Electric resistance welding (e.g., Soudronic welding) has recently come to be used for making cans. It is, however, essential to ensure the corrosion resistance of the welded portion.

Although the conventional tinplate is used for making various kinds of vessels as hereinabove described, it has the disadvantage that its tin layer is highly cathodic as compared with its base sheet, resulting in the dissolution of iron through its defective portions, such as pinholes, or scratches made during the manufacture of the vessel, which gives rise to rusting or perforative corrosion, depending on the contents of the vessel and its environment.

SUMMARY OF THE INVENTION

Under these circumstances, it is an object of this invention to provide tinned steel sheet having a very high degree of corrosion resistance and a very long life and a method of producing the same. According to this invention, an undercoating layer of nickel or a nickel alloy is formed on the surface of a base steel sheet and a layer of tin is formed thereon. It is also essential to employ for the base sheet steel having an appropriately controlled composition so that the base sheet per se may be improved in corrosion resistance. The base sheet and the undercoating layer cooperate with the tin layer to render it capable of preventing anodic corrosion even if the environment, or the substance in a vessel formed from the tinplate contains $Cl^-$ ions. The combination of the base sheet, the undercoating layer and the tin layer minimizes the dissolution of iron through any defective portions of the coating, such as pinholes or uncoated portions, and the edges of the coating and thereby provides tinplate of high corrosion resistance which is substantially free from any rusting or perforative corrosion.

It is another object of this invention to provide tinplate which is equally highly resistant to corrosion, even if it may be exposed to a substance which renders its tin layer cathodic, for example, a substance containing phosphoric acid ions, and a method of making the same. This object is attained by reducing an electric current coupling the tin layer to the base sheet.

This invention, thus, provides coated steel sheet of high corrosion resistance comprising a sheet of steel containing not more than 0.1% of carbon, 0.005 to 0.08% of soluble aluminum and 0.2 to 20% of chromium, the balance being iron and unavoidable impurities, a first coating layer formed on at least one surface of the steel sheet, composed of nickel or a nickel alloy and having a thickness of 0.001 to 1.5 microns, and a second coating layer formed on the first coating layer, composed of tin and having a thickness of at least 0.05 micron, and a method of producing the same.

The steel may further contain a total of 0.03 to 0.5% of at least one element selected from Ti, Nb, Zr and V. It may further contain not more than 3.0% of nickel.

Figure 2:
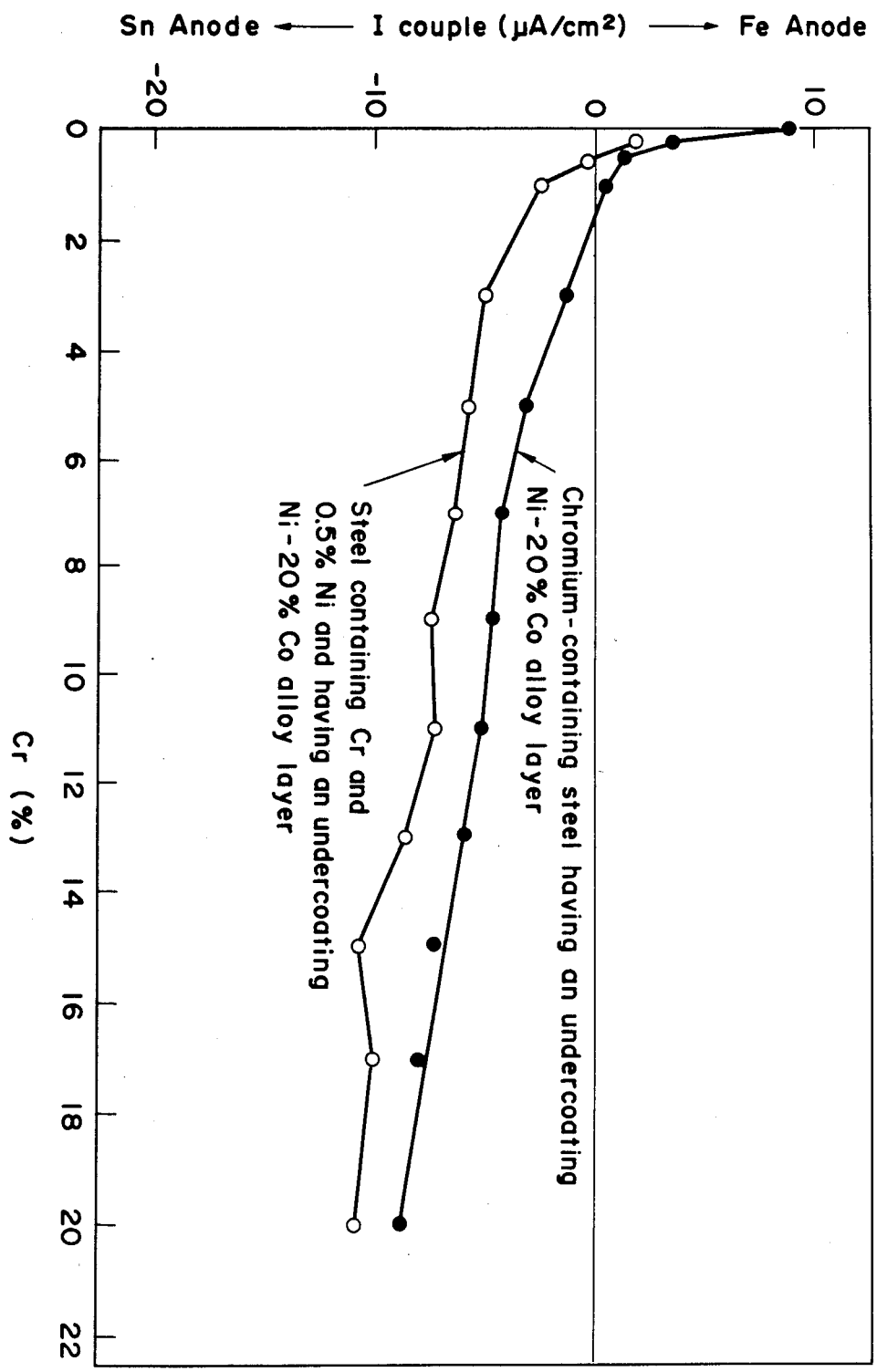
Figure 3:
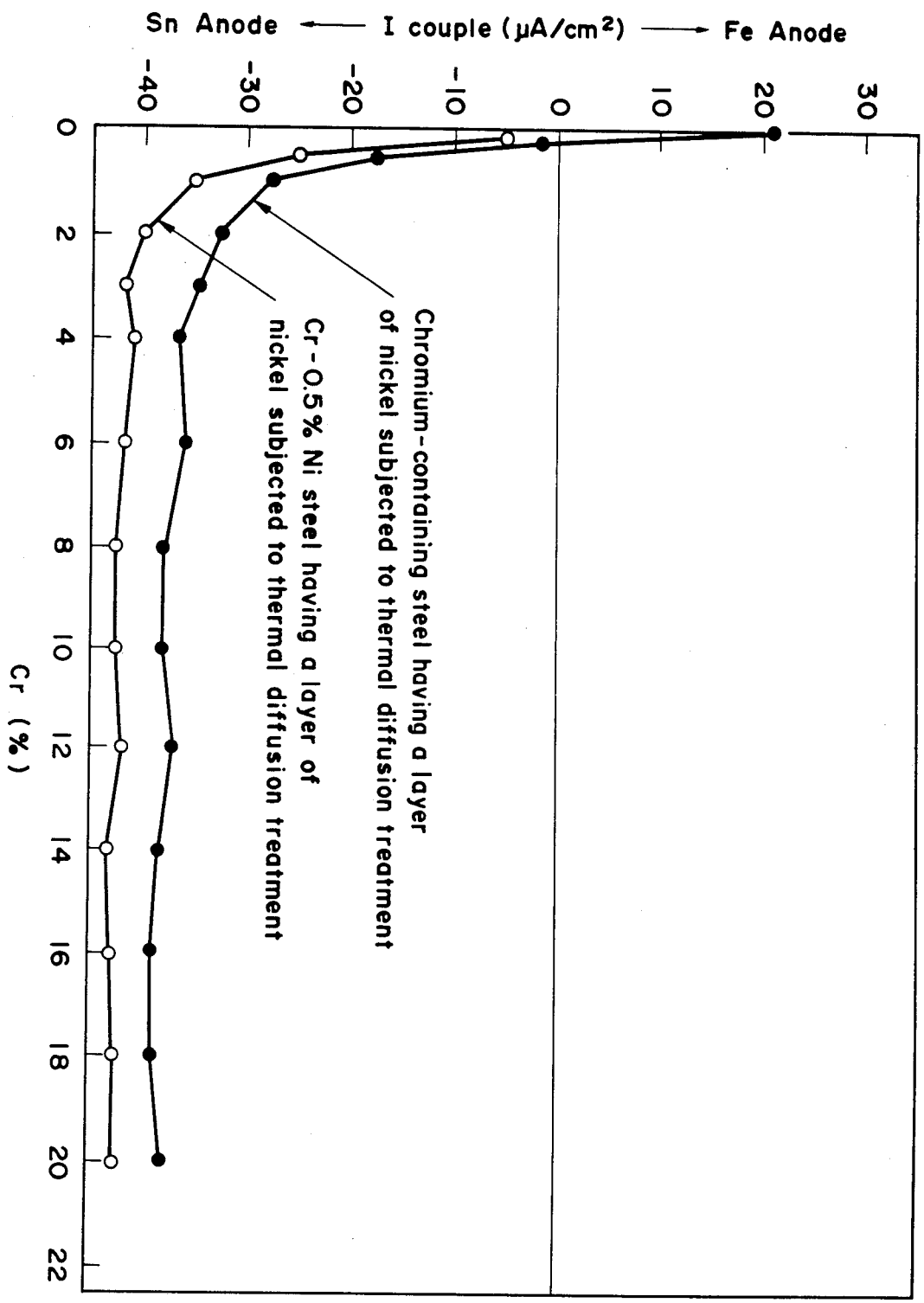
Figure 4:
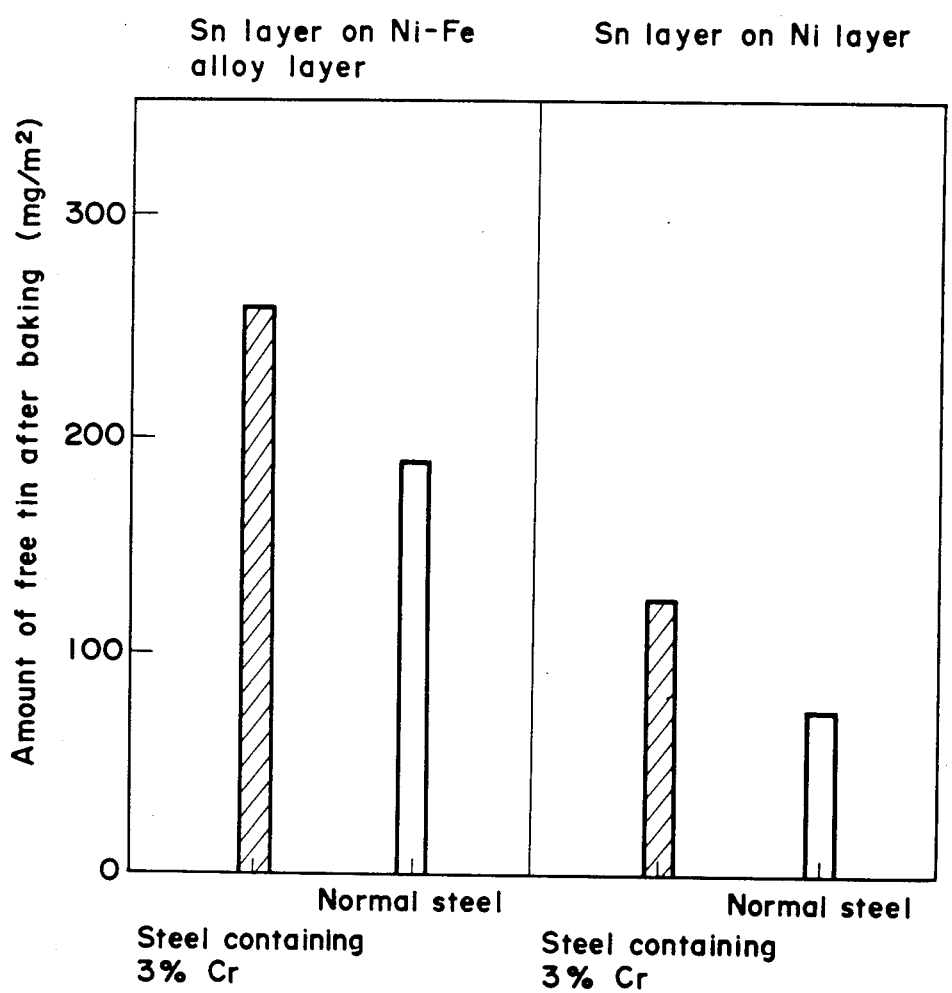
Figure 5:
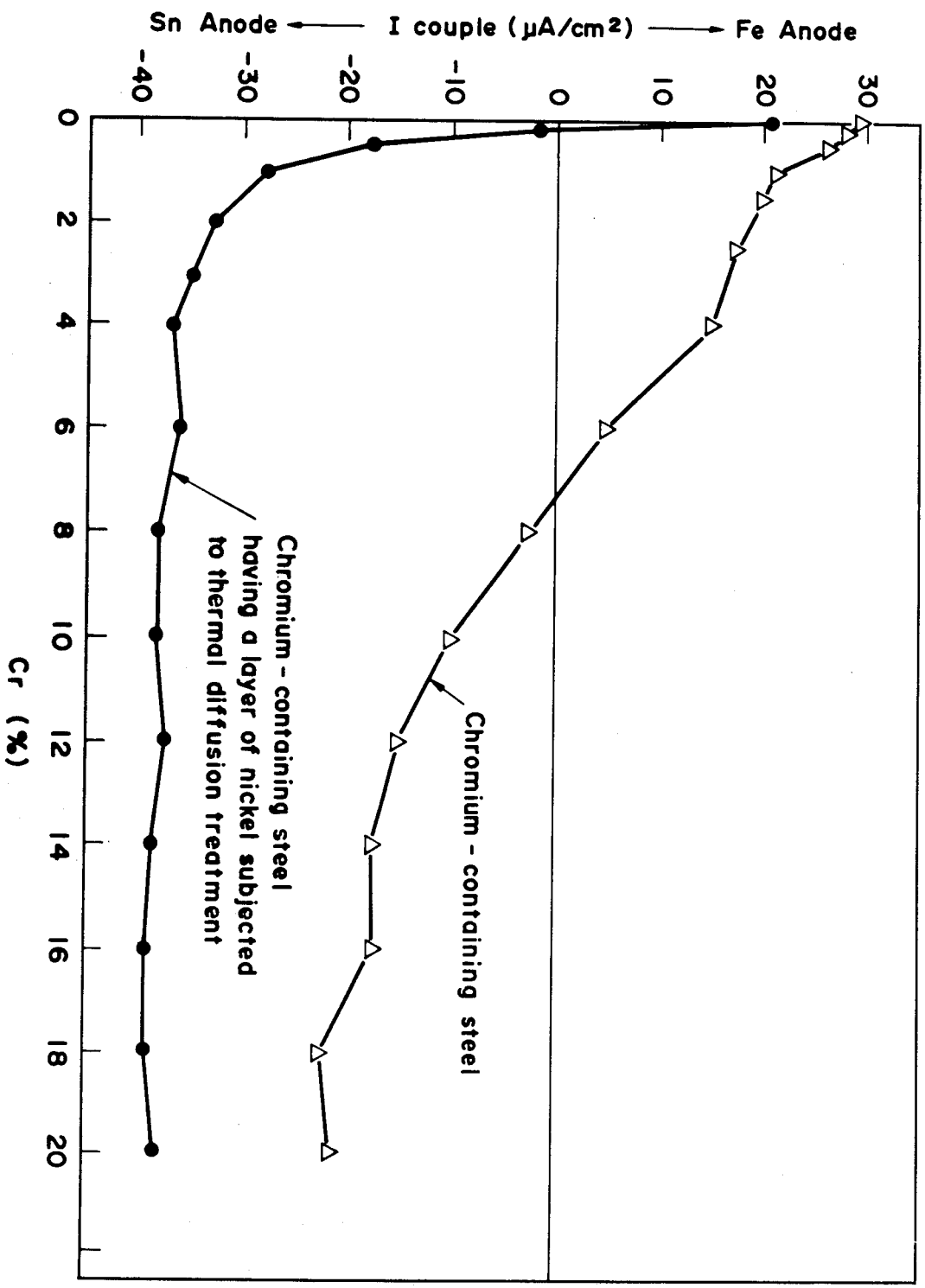
Figure 6:
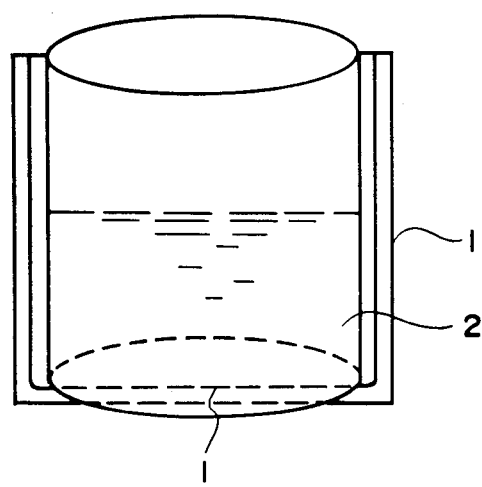

FIG. 2 is a graph showing the corrosive coupling electric current as measured between chromium-containing steel sheet having a 0.05 micron thick undercoating layer of a nickel alloy containing 20% of cobalt and a layer of tin formed thereon, and also between Cr—Ni steel sheet containing 1% of nickel and having a 0.05 micron thick undercoating layer of a Ni-20% Co alloy and a layer of tin formed thereon, in a 0.3% aqueous solution of phosphoric acid, which was employed to accelerate corrosion on the inner surface of each coated steel sheet, in relation to its chromium content;

FIG. 3 is a graph showing the corrosive coupling electric current as measured between chromium-containing steel sheet having a 0.11 micron thick undercoating layer of nickel formed thereon and subjected to 60 seconds of thermal diffusion treatment at 750° C. and a layer of tin formed thereon, and also between Cr-Ni steel sheet containing 0.5% of nickel and having a 0.11 micron thick undercoating layer of nickel formed thereon and subjected to the same thermal diffusion treatment and a layer of tin formed thereon, in a 5% aqueous solution of sodium chloride, which was employed to accelerate corrosion on the outer surface of a vessel formed from each coated steel sheet and also simulate a substance containing salt or impurities contained in fuel, in relation to the chromium content of each coated steel sheet;

FIG. 4 is a graph showing the amount of free tin which was found on each of 3% Cr steel sheet carrying a 0.003 micron thick layer of a nickel alloy containing 20% of iron and a layer of tin containing 750 mg of tin per square meter and 3% Cr steel sheet carrying a 0.002 micron thick layer of nickel and a layer of tin containing 750 mg of tin per square meter, after the coating had been baked at 205° C. for 10 minutes three times;

FIG. 5 is a graph showing the corrosion coupling electric current as measure between chromium-containing steel sheet not carrying any undercoating layer of nickel and a layer of tin formed thereon, and also between chromium-containing steel sheet carrying an undercoating layer of nickel and a layer of tin formed thereon, in a 5% aqueous solution of sodium chloride, in relation to the chromium content of each coated steel sheet; and FIG. 6 is a perspective view of a seam-welded fuel tank made for testing purposes.

DETAILED DESCRIPTION OF THE INVENTION

The tinplate of this invention comprises a sheet of steel containing not more than 0.1% by weight of carbon, 0.005 to 0.08% by weight of acid-soluble aluminum and 0.2 to 20% by weight of chromium. It may also contain a total of 0.03 to 0.5% by weight of at least one of titanium, niobium, zirconium and vanadium. It may further contain not more than 3% by weight of nickel. The steel sheet can be manufactured by a customary process which includes melting in a converter, electric or other melting furnace, slab forming either by continuous casting or by ingot blooming, hot rolling, cold rolling and annealing.

The steel can contain up to a maximum of 0.1% by weight of carbon. It is preferable to reduce its carbon content as far as possible. An increase in the amount of carbon gives rise to an increase in the precipitation of chromium carbide. It not only lowers the mechanical properties and corrosion resistance of the steel, but also disables the formation of a uniform coating layer. If the steel contains titanium, niobium, zirconium or vanadium, it is preferable to limit its carbon content to a maximum of 0.02% by weight in order to ensure its good workability and the formation of a uniform coating layer which would be prevented by the precipitation of a carbide, such as titanium carbide.

If the steel contains only less than 0.005% by weight of soluble aluminum, it is difficult to prevent during the melting of the steel the generation of blowholes by oxidizing gas which are very likely to develop surface defects on the steel and thereby lower its corrosion resistance. If the steel contains over 0.08% by weight of soluble aluminum, the scattering of aluminum oxide on the steel surface disables the formation of a sound coating layer which is free from uncoated spots, or pinholes, and which ensures the high corrosion resistance of the steel sheet. Therefore, it is essential to use steel containing 0.005 to 0.08% by weight of acid-soluble aluminum.

Figure 1:
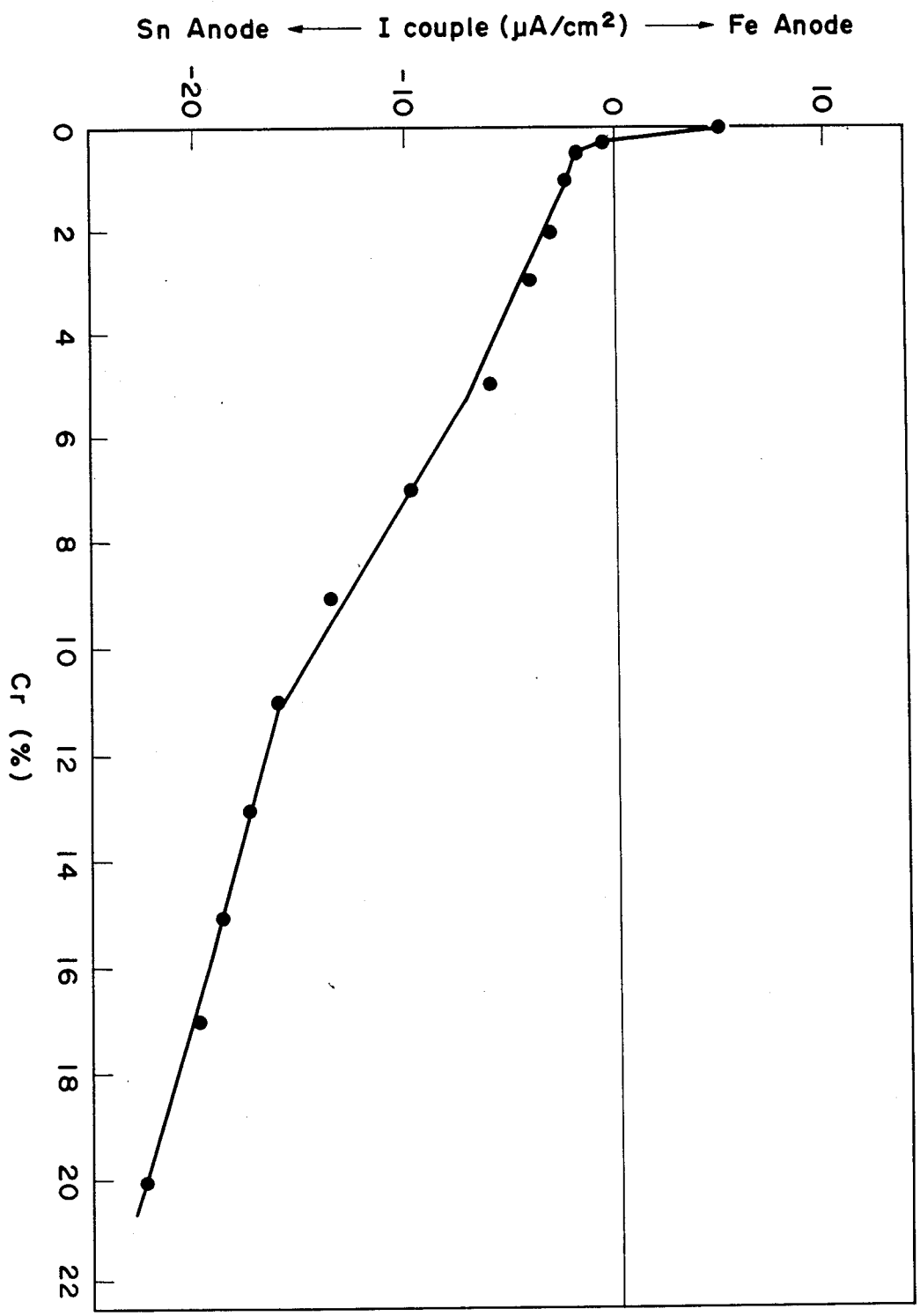
FIG. 1 is a graph showing the corrosive coupling electric current as measured between chromium-containing steel sheet having a 0.002 micron thick undercoating layer of nickel formed thereon and a layer of tin formed thereon in an aqueous solution containing 1.5% of citric acid and 1.0% of sodium chloride, which was employed to accelerate corrosion on the inner surface of a vessel formed from the coated steel sheet, in relation to its chromium content.

The steel contains at least 0.2% by weight of chromium. It prevents the dissolution of iron, and perforative corrosion through any defective portion of the coating layer and thereby improves the corrosion resistance of the tinplate in a corrosive environment to which it is exposed. Reference is made to FIG. 1 showing the corrosive coupling electric current as measured between chromium-containing steel sheet having an undercoating layer of nickel formed thereon and a layer of tin formed thereon in a corrosion accelerating solution containing Cl$^-$ ions. As is obvious therefrom, the tin showed a high power of anodic sacrificial protective effect when the steel contains at least 0.2% by weight of chromium, particularly at least 0.5% thereof, and more particularly, at least 3% thereof.

FIG. 2 shows the similar results obtained by employing a corrosion accelerating solution containing phosphoric acid ions. While the tin layer was cathodic as compared with the steel sheet, it was found possible to reduce the corrosive coupling electric current drastically and thereby restrict the dissolution of iron through the defective portions of the coating when the steel contained at least 0.2%, particularly at least 0.5%, by weight of chromium. The tin layer exerts the anodic sacrificial protective effect completely when the steel contained at least 3% by weight of chromium.

FIG. 3 shows the similar results obtained by exposing the outer surface of a vessel to a corrosion accelerating solution and employing a solution simulating a substance containing corrosive matter. The tin layer showed a power of anodic sacrificial protective effect when the steel contained at least 0.2% by weight of chromium.

As is obvious from these results, the steel containing chromium and the undercoating layer of nickel or a nickel alloy formed thereon cooperate with the tin layer to prevent the dissolution of iron and the occurrence of rusting or perforative corrosion through any exposed portion of the steel. This is the mechanism which improves the corrosion resistance and life of the tinplate according to this invention drastically. In order to ensure this advantage, it is important for the steel to contain at least 0.2% by weight of chromium, preferably at least 0.5% thereof, and more preferably, at least 3% thereof. It is also important for the steel to contain not more than 20% by weight of chromium, preferably not more than 11% thereof. If it contains more than 20% by weight of chromium, it is difficult to form a uniform layer of nickel or tin adhering strongly to the base material. The use of steel containing not more than 11% by weight of chromium and composed of alpha- and gamma-phases is particularly preferable, since it makes a sheet which is substantially free from any coarsened crystal grain, and which is highly resistant to ridging, that is skin roughening even if it is subjected to a hard work of shaping.

The use of steel of the composition as hereinabove defined makes it possible to produce tinplate of improved corrosion resistance particularly in any portion thereof where iron is exposed, for example, a score portion in the lid of a can of the easy-to-open type, or the ends of a can.

According to a preferred aspect of this invention, tinplate is produced from steel of the composition as hereinabove defined, and further containing at least one of titanium, niobium, zirconium, vanadium and nickel to ensure a still higher degree of corrosion resistance even in a highly corrosive environment.

If the steel contains at least one of titanium, niobium, zirconium and vanadium, it combines with carbon in the steel to make chromium work more effectively, and improves the workability and corrosion resistance of the steel. The presence of one or more of these elements in a total amount which is less than 0.03% by weight is not sufficient to prevent the precipitation of chromium carbide and thereby improve the workability and corrosion resistance of the steel. If its or their total amount exceeds 0.5% by weight, however, its or their precipitation causes the hardening of the steel and lowers its workability. It is, therefore, important to add a total of 0.03 to 0.5% by weight of at least one of those elements. A preferred range is from 0.075 to 0.2% by weight.

The addition of nickel is effective, as it cooperates with chromium to improve the corrosion resistance of the steel and the function of the tin layer as a sacrificial anode for preventing corrosion. Nickel is added in the quantity of 3.0% at maximum, preferably from 0.1 to 1.0%, by weight. The addition of over 3% of nickel does not produce any corresponding improvement in corrosion resistance, but rather makes difficult activation by pickling prior to coating. It makes it difficult to ensure the formation of an undercoating layer of nickel or a nickel alloy or a layer of tin which is uniform and adheres to the steel strongly, especially when the tinplate is subjected to a hard work of shaping.

Steel containing nickel in addition to chromium has a cathodic protection potential in a corrosive environment and is superior in corrosion resistance to steel not containing nickel. The addition of nickel ensures a higher degree of anodic protection by the tin layer in a corrosive environment containing, for example, $Cl^-$ ions or citric acid. If the steel has so low a chromium content that the tin layer is cathodic in an environment containing phosphoric acid ions, the amounts of the coupling corrosive current generated by the steel and the tin layer are still closer to each other and the tin layer shows a still higher power of anodic protection. The dissolution of iron at the defective spots on the tin layer is restricted and a drastic improvement in corrosion resistance can be obtained. The results confirming these advantages are shown by way of example in FIGS. 2 and 3.

Another advantage of the addition of chromium is that it inhibits the mutual diffusions of the iron in the steel and the nickel and tin in the coating layers during the baking process. Therefore, a greater amount of free tin remains on the surface of steel containing chromium than on that of steel not containing chromium, as shown in FIG. 4. This improves the corrosion resistance of the steel. If the tinplate is used for making a welded can, the tin decreases its surface contact resistance and thereby improves its weldability.

Although the steel of the composition as hereinabove described is superior in corrosion resistance to any conventional steel containing chromium as one element of unavoidable impurities, its corrosion resistance is not always sufficiently high to render it suitable for making fuel tanks or other vessels. If a vessel holds a substance containing an organic acid or $Cl^-$ ions, it is likely to cause the dissolution of iron or the occurrence of heavy rusting. If the outer surface of the vessel is exposed to an environment containing $Cl^-$ ions, or having a high temperature and a high humidity, it becomes rusty in a relatively short time. A paint can be applied directly to steel sheet, but if it is exposed to a corrosive environment for a long time, a corrosive aqueous solution passing through the paint forms a product of corrosion on the steel and thereby causes the separation of the paint from the steel.

Although the steel of the composition as hereinabove described shows a relatively high degree of corrosion resistance in the presence of gasoline or alcoholic fuel, it is likely to become rusty or cause perforative corrosion if it is exposed to, for instance, water in a fuel, or water containing $Cl^-$ ions. This is particularly the case in a corrosive environment containing $Cl^-$ ions, for example, in an area in which an anti-freezing agent is sprinkled on a road, or in a region exposed to the wind from the sea.

According to this invention, therefore, the steel of the composition as hereinabove described is coated with a layer of nickel or a nickel alloy and then with a layer of tin after it has been subjected to ordinary pretreatment including degreasing and pickling. The nickel in the undercoating layer cooperates with the chromium in the steel to render a cathodic immersion potential in a corrosive environment and imparts an improved power of sacrificial protection to the tin layer. As nickel or an alloy thereof has a very high degree of diffusion or leak reactivity with tin, the undercoating layer and the tin layer form a tight alloy layer at a room temperature, or after hot melt treatment. This alloy layer reduces the defective coating portions and improves the corrosion resistance and the coating adherence.

The undercoating layer of nickel or a nickel alloy is, thus, an essential part of this invention. Although there is no particular limitation to the conditions which can be employed to form it, it is generally appropriate to employ a current density of 3 to 300 $A/dm^2$ and a temperature not exceeding 80° C. The following is illustrative of the plating bath composition and the plating conditions:

(1) Nickel Plating:
  Bath composition:   $NiSO_4.6H_2O$   240 g/liter
                      $NiCl_2.6H_2O$   45 g/liter
                      $H_3BO_3$        40 g/liter
  pH:                 4.0
  Current density:    15 $A/dm^2$
  Bath temperature:   60° C.
(2) Ni—Fe Alloy Plating:
  Bath composition:   $NiSO_4.6H_2O$   240 g/liter

|     |                    | NiCl$_2$.6H$_2$O      | 45 g/liter       |
| --- | ------------------ | --------------------- | ---------------- |
|     |                    | FeSO$_4$.7H$_2$O      | 60 to 80 g/liter |
|     |                    | H$_3$BO$_3$           | 40 g/liter       |
|     | pH:                | 1.5                   |                  |
|     | Current density:   | 5 to 20 A/dm$^2$      |                  |
|     | Bath temperature:  | 50° C.                |                  |
| (3) | Ni—Sn Alloy Plating: |                     |                  |
|     | Bath composition:  | SnCl$_2$.2H$_2$O      | 50 g/liter       |
|     |                    | NiCl$_2$.6H$_2$O      | 300 g/liter      |
|     |                    | NaF                   | 28 g/liter       |
|     |                    | NH$_4$HF$_2$          | 35 g/liter       |
|     | pH:                | 2.5                   |                  |
|     | Current density:   | 2.5 to 10 A/dm$^2$    |                  |
|     | Bath temperature:  | 65° C.                |                  |

It is alternatively possible to form a Ni—Fe alloy layer by forming a nickel layer as shown at (1) above, and subjecting it to thermal diffusion treatment at a temperature of 550° C. to 900° C. in a non-oxidizing atmosphere. This method has a number of advantages as will hereinafter be described. The chromium-containing steel employed in accordance with this invention is usually liable to oxidation when it is annealed. This oxidation can be avoided if a nickel layer is formed on steel as cold rolled prior to annealing after it has been degreased and pickled, and subjected to thermal diffusion treatment at a temperature of 500° C. to 900° C. simultaneously with its annealing. The strain remaining in the steel as cold rolled promotes the mutual diffusion of nickel and iron and thereby accelerates the formation of a uniform Ni-Fe alloy layer. In addition to the Ni-Fe alloy layer formed as hereinabove described, it is possible to form another layer of nickel or a nickel alloy.

The nickel or nickel alloy layer is formed with a thickness of 0.001 to 1.5 microns, or a preferred thickness of 0.05 to 0.5 micron. A layer having a thickness which is less than 0.001 micron fails to cover the steel sheet uniformly and undergo a sufficient alloying reaction with the tin layer to reduce any defective coating portion. A layer having a thickness exceeding 1.5 microns is not expected to produce any correspondingly improved results, but results in the formation of a relatively hard Ni—Sn alloy layer which is thick and likely to crack to a depth reaching the surface of the tin layer when the tinplate is shaped, and thereby lower its corrosion resistance. The undercoating layer may also be formed from, for example, a Ni-Co or Ni-P alloy.

A layer of tin is, then, formed on the nickel or nickel alloy layer directly, or after the latter has been pickled or otherwise activated. The coating may or may not be subjected thereafter to hot melt treatment. The formation of the tin layer and the hot melt treatment can be carried out in accordance with the conditions which are ordinarily employed. The tin layer may, for example, be formed by employing one of the following plating baths at a current density of 5 to 100 A/dm$^2$ and a bath temperature of 30° C. to 60° C.:

| (1) | Ferrostannous bath: |  |  |
| --- | ------------------- | --- | --- |
|     | Phenosulfonic acid  | 10 to 30 g/liter (in terms of sulfuric acid) |  |
|     | SnSO$_4$            | 40 to 80 g/liter |  |
|     | ENSA (additive made by E. I. du Pont de Nemours) | 5 to 15 g/liter |  |
| (2) | Halide bath:        |  |  |
|     | Stannous chloride   | 50 to 100 g/liter |  |
|     | Sodium fluoride     | 15 to 35 g/liter  |  |
|     | Potassium hydrogensulfide | 40 to 60 g/liter |  |
|     | Sodium chloride     | 30 to 60 g/liter  |  |

| Naphthosulfonic acid | 1 to 5 g/liter |
| --- | --- |

The hot melt treatment of the tin layer is effective for increasing its metallic luster to improve the outward appearance of the tinplate and for forming a Ni—Sn alloy layer of still higher uniformity and density to achieve a still higher degree of corrosion resistance. The tin layer is melted at a temperature of 240° C. to 350° C., or preferably 250° C. to 300° C., in the air, or in a non-oxidizing atmosphere such as nitrogen gas, after it has been washed in water. A flux may, or may not, be employed when the tin layer is melted. If a flux is employed, an aqueous solution thereof is applied to the tin layer by dipping or spraying. The flux may, for example, be composed of 2 to 10 g of phenolsulfonic acid (in terms of sulfuric acid) and 2 to 10 g of SnSO$_4$ per liter if a ferrostannous bath is used for forming the tin layer.

While the tin layer has been described as being formed by electroplating, it is, of course, possible to employ any other appropriate method, such as hot dip coating or vacuum deposition.

The tin layer is required to have a thickness of at least 0.05 micron, and preferably, at least 0.15 micron. If its thickness is less than 0.05 micron, it fails to cover the tinplate uniformly and as tin is consumed for the anodic protection of any defective coating portion, it is likely to lose its power for anodi protection within a relatively short time. While there is no particular limitation to the maximum thickness of the tin layer, a usual thickness range is, for example, from 0.05 to 1.5 microns on tinplate used for making an ordinary vessel, and from 1 to 10 microns on tinplate for making a fuel tank.

The tinplate of this invention is often coated with a paint if it is used for making a vessel. After a long period of storage, however, an oxide film is likely to form on the surface of the tin layer and change its color. It is, therefore, preferable to wash the tin layer in water to remove any remaining matter from its surface, and subject it to chromate treatment. This treatment may be carried out by using an aqueous solution of anhydrous chromic acid, a chromate such as ammonium or sodium chromate, or a dichromate such as ammonium or sodium dichromate, or a mixture thereof, or any such solution further conatining, for example, SO$_4$$^{-2}$ ions or a fluoride. It is also useful to treat the surface of the tin layer chemically with an aqueous solution containing phosphoric acid ions to inhibit the growth of an oxide film thereon or improve its paint applicability. There is no particular limitation to the composition of the bath used for the chromate or phosphoric acid treatment, or the conditions under which it is carried out. The following is merely illustrative of the bath composition and the conditions:

| (1) | Chromate treatment: |  |  |
| --- | --- | --- | --- |
|     | Bath composition:   | CrO$_3$      | 60 g/liter |
|     |                     | SO$_4$$^{-2}$ | 0.3 g/liter |
|     | Current density:    | 7.5 A/dm$^2$ |  |
|     | Bath temperature:   | 60° C.       |  |
|     | Coating weight:     | 14.5 mg/m$^2$ | (in terms of chromium) |
| (2) | Chromate treatment: |  |  |
|     | Bath composition:   | Sodium dichromate | 30 g/liter |
|     | Current density:    | 10 A/dm$^2$  |  |
|     | Bath temperature:   | 45° C.       |  |
|     | Coating weight:     | 6 mg/m$^2$   |  |
| (3) | Phosphoric acid treatment: |  |  |

| -continued | | |
|---|---|---|
| Bath composition: | Phosphoric acid | 10 g/liter |
| Current density: | 10 A/dm$^2$ | |
| Bath temperature: | 50° C. | |
| Coating weight: | 1.4 mg/m$^2$ | |
| (4) Phytic acid treatment: | | |
| Bath composition: | Phytic acid | 25 g/liter |
| Bath temperature: | 60° C. | |
| Coating weight: | 2.1 mg P/m$^2$ | |

The steel used for making the tinplate of this invention contains unavoiable impurities, such as Mn, P, Si and S, which cannot be removed during the process of steel production in accordance with a currently available standard of technology. Likewise, the nickel or nickel alloy layer contains unavoidable impurities, such as Co and S.

The invention will now be described more specifically with reference to examples thereof.

EXAMPLE I

Chromium-containing steels of different compositions as shown in TABLE 1 were degreased and pickled as was usually done prior to electroplating, and coated with a layer of nickel or (Ni-Sn) alloy electrolytic coating, (Ni-Fe) alloy electrolytic coating, Ni coating with diffusion treatment in different ways as shown in TABLE 1. A layer of tin was formed on each sample and some of the samples were thereafter subjected to hot melt treatment, while the others were not. Then, each sample was subjected to chromate treatment. A beverage can was formed from the tinplate of each steel to which a paint had been applied, and also from the tinplate to which no paint had been applied. Each can was tested for corrosion resistance, as will hereinafter be described in detail. The results are shown in TABLE 2.

For comparison purposes, steels not containing chromium were coated with tin and steels containing chromium were directly coated with tin, as shown in TABLE 1. They were likewise tested for corrosion resistance. The results are shown in TABLE 2.

The following tests were conducted:

(1) Corrosion Resistance of a Defective Coating Portion:

A 0.25 mm thick, 50 mm square test specimen was prepared from each tinplate. Its edges and surfaces were sealed and a scratch reaching the steel base was formed in the surface to be tested. It was dipped in 400 ml of an aqueous solution containing 1.5 wt% of citric acid and 1.5 wt% of NaCl. This test was continued for 300 hours at a temperature of 50° C. in a nitrogen gas atmosphere which was substantially free from any oxygen. Its corrosion resistance was evaluated by examining:

(a) the dissolution of iron through the scratch; and (b) the perforative corrosion of the scratch, which was examined by the microscopic examination of its cross section.

The symbols appearing in TABLE 2 to show the results of evaluation have the following meanings:

(a) Dissolution of iron (amount per cm$^2$ of the test specimen)

⊚ : Less than 10 ppm
○: 10 ppm to less than 25 ppm
Δ: 25 ppm to less than 50 ppm
x: 50 ppm or above (b) Perforative corrosion (ratio of the maximum corrosion depth below the scratch to the specimen thickness)

⊚ : Less than 10%
○ : 10% to less than 25%
Δ: 25% to less than 50%
x: 50% or above (2) Corrosion Resistance of a Defective Coating Portion:

A 0.25 mm thick, 50 mm square test specimen was prepared from each tinplate. Its edges and surfaces were sealed and a scratch reaching the steel base was formed in the surface to be tested. It was dipped in 400 ml of a 1.5 wt% aqueous solution of citric acid. This test was continued for 480 hours at a temperature of 50° C. in a nitrogen gas atmosphere which was substantially free from any oxygen. Its corrosion resistance was evaluated by examining (a) the dissolution of iron through the scratch and (b) the perforative corrosion below the scratch. The results are shown in TABLE 2 by the symbols which have been explained at (1) above.

(3) Edge Rusting:

(a) A 0.24 mm thick test specimen was prepared from each tinplate and formed with a cut edge. It was subjected to a plurality of test cycles each consisting of 60 minutes of exposure to a temperature of −5° C., 60 minutes of exposure to a temperature of 49° C. and a humidity of at least 98%, and 180 minutes of standing at a temperature of 30° C. until rust appeared on the cut edge. The symbols used in TABLE 2 to show the test results have the following meanings. Each symbol indicates the number of the cycle during which rust appeared.

⊚: 12th cycle or later
○ : 9th to 11th cycle
Δ: 6th to 8th cycle
x: 5th cycle or earlier (b) A 0.25 mm thick test specimen was prepared from each tinplate and formed into a shape having a diameter of 44 mm and a depth of 8 mm. It was so positioned that its cut edge might face downward, and an outdoor exposure test was conducted to examine the appearance of rust on the cut edge. The symbols used in TABLE 2 to show the test results have the following meanings. Each symbol indicates the period of time for which the test was continued until rust appeared.

○ : 10 days or more
⊚ : Six to nine days
Δ: Three to five days
x: Two days or less (4) Paint Application Tests:

(a) Paint adhesion

A layer of an epoxyphenolic paint having a thickness of five microns was applied to a test specimen prepared from each tinplate and a scratch reaching the steel base was formed therein. It was dipped in an aqueous solution containing 1.5 wt% of citric acid and 1.5 wt% of NaCl. The test was continued for 96 hours at a temperature of 27° C. in a carbon dioxide gas atmosphere which was substantially free from any oxygen. After it had been dried, a cellophane tape was bonded thereto immediately. The tape was removed from the test specimen to see if the paint was separated from the area in which the scratch had been formed. The symbols used in TABLE 2 to show the test results have the following meanings. Each symbol indicates the degree of paint separation.

⊚ : Virtually zero;

○ : Slight;
Δ: Substantial;
x: Heavy.

(b) Corrosion resistance at the scratch

Measurement was made of the depth of the perforative corrosion which had appeared at the scratch on each test specimen prepared at (a) above after 200 hours of immersion at 55° C. in a carbon dioxide gas atmosphere. Each of the symbols used in TABLE 2 to show the test results indicates the ratio of the maximum corrosion depth to the thickness of the test specimen:

⊚ : Virtually zero;
○ : Less than 10%;
Δ: 10% to less than 30%;
x: 30% or more.

(5) Tests on a Score Portion on the Lid of a Can:

A 0.21 mm thick test specimen was prepared from each tinplate and formed into a lid for a can of the easy-to-open type having a thickness of 75 microns along a score. That surface of the lid which would face the interior of the can was sealed, and the lid was dipped in an aqueous solution containing 1.5 wt% of citric acid and 1.5 wt% of NaCl at 55° C. for 96 hours in an atmosphere containing oxygen.

(a) Paint adhesion

After each test specimen had been dried, a paint adhesion test was conducted immediately by using a cellophane tape to determine the width of the area in which the paint was separated from the test specimen along the score. Each of the symbols used in TABLE 2 indicates the width of such separation, as follows:

⊚ : Less than 0.40 mm;
○ : 0.40 mm to less than 0.60 mm;
Δ: 0.60 mm to less than 1.0 mm;
x: 1.0 mm or more.

(b) Perforative corrosion

Then, the cross section of each test specimen was examined by a microscope to determine the depth of perforative corrosion in the score. Each of the symbols used in TABLE 2 indicates the ratio of the maximum corrosion depth to the thickness of the test specimen at the score, as follows:

○ : Less than 20%;
⋫ : 20% to less than 40%;
Δ: 40% to less than 60%;
x: 60% or more.

(6) Workability:

A blank having a diameter of 150 mm was prepared from a 0.28 mm thick tinplate sheet and formed into a cylinder having a depth of 60 mm. Examination was made to see if any crack had appeared, and if any scratch had been formed on the outer coating layer. Each of the symbols used in TABLE 2 indicates the degree of workability, as follows:

⊚ : Very good;
○ : Good;
Δ: Poor;
x: Very poor.

TABLE 1

Steels used for making tinplate in EXAMPLES I & II

| | Steel composition (wt %) | | | | | | | | |
|---|---|---|---|---|---|---|---|---|---|
| | C | Si | Mn | P | S | Sol Al | Cr | Ni | Ti, Nb, Zr, V |
| Example 1 | 0.07 | 0.15 | 0.22 | 0.015 | 0.013 | 0.07 | 0.8 | — | — |
| Example 2 | 0.006 | 0.14 | 0.19 | 0.014 | 0.016 | 0.03 | 0.8 | 0.12 | Ti; 0.10 |
| Example 3 | 0.005 | 0.06 | 0.16 | 0.011 | 0.012 | 0.04 | 1.5 | — | Ti; 0.08, V; 0.01 |
| Example 4 | 0.08 | 0.04 | 0.30 | 0.012 | 0.008 | 0.05 | 1.8 | 0.2 | — |
| Example 5 | 0.004 | 0.13 | 0.18 | 0.015 | 0.011 | 0.06 | 3.0 | — | Ti; 0.10, Zr; 0.01, V; |
| Example 6 | 0.005 | 0.03 | 0.16 | 0.007 | 0.006 | 0.05 | 3.0 | 1.2 | Ti; 0.08, Nb; 0.03 |
| Example 7 | 0.06 | 0.05 | 0.25 | 0.018 | 0.014 | 0.04 | 5.1 | — | — |
| Example 8 | 0.004 | 0.12 | 0.28 | 0.014 | 0.015 | 0.03 | 5.1 | — | Nb; 0.19, V; 0.01 |
| Example 9 | 0.003 | 0.08 | 0.12 | 0.012 | 0.014 | 0.07 | 5.2 | 0.2 | Ti; 0.12 |
| Example 10 | 0.006 | 0.07 | 0.18 | 0.008 | 0.008 | 0.02 | 6.8 | — | Ti; 0.08 |
| Example 11 | 0.004 | 0.14 | 0.24 | 0.014 | 0.012 | 0.08 | 7.0 | 1.5 | Ti; 0.16 |
| Example 12 | 0.008 | 0.17 | 0.27 | 0.016 | 0.016 | 0.06 | 7.5 | — | Ti; 0.12, Nb; 0.02, V; 0.01 |
| Example 13 | 0.07 | 0.15 | 0.22 | 0.015 | 0.013 | 0.07 | 9.8 | — | Ti; 0.25 |
| Example 14 | 0.006 | 0.14 | 0.19 | 0.014 | 0.016 | 0.03 | 10.5 | 0.12 | Ti; 0.10 |
| Example 15 | 0.005 | 0.06 | 0.16 | 0.011 | 0.012 | 0.04 | 12.8 | — | Ti; 0.08, V; 0.01 |
| Example 16 | 0.08 | 0.04 | 0.30 | 0.012 | 0.008 | 0.05 | 15.1 | 0.50 | Ti; 0.19 |
| Example 17 | 0.004 | 0.13 | 0.18 | 0.015 | 0.011 | 0.06 | 16.8 | — | Ti; 0.10, Zr; 0.01, V; 0.02 |
| Example 18 | 0.005 | 0.03 | 0.16 | 0.007 | 0.006 | 0.05 | 18.5 | — | Ti; 0.08, Nb; 0.03 |
| Comparative Example 1 | 0.04 | 0.06 | 0.21 | 0.015 | 0.012 | 0.08 | — | — | — |
| Comparative Example 2 | 0.005 | 0.12 | 0.18 | 0.014 | 0.012 | 0.06 | — | — | Ti; 0.15 |
| Comparative Example 3 | 0.06 | 0.15 | 0.28 | 0.013 | 0.013 | 0.07 | 0.005 | — | — |
| Comparative Example 4 | 0.005 | 0.07 | 0.19 | 0.015 | 0.016 | 0.03 | 1.8 | — | Ti; 0.08, Nb; 0.02 |
| Comparative Example 5 | 0.07 | 0.12 | 0.25 | 0.012 | 0.011 | 0.06 | 3.5 | 0.35 | — |
| Comparative Example 6 | 0.006 | 0.07 | 0.18 | 0.008 | 0.008 | 0.02 | 3.5 | — | Ti; 0.08 |
| Comparative Example 7 | 0.004 | 0.06 | 0.13 | 0.011 | 0.012 | 0.05 | 7.1 | 0.10 | Ti; 0.10, Nb; 0.03 |

Treatment employed for making tinplate in EXAMPLE I

| | Undercoating | Tin layer thickness | Hot melt treatment | Chromate treatment |
|---|---|---|---|---|
| Example 1 | 0.02μ thick Ni | 0.15μ | — | 4.5 mg/m² hydrated chromium oxide |
| Example 2 | 0.03μ thick Ni with 30 sec. of diffusion treatment at 780° C. | 0.12μ | — | 1 mg/m² metallic chromium and 7.6 mg/m² hydrated chromium oxide |
| Example 3 | 0.1μ thick 20% Ni—Fe alloy | 0.3μ | 250° C. for 1 sec. using a dilution of | 4.5 mg/m² metallic |

TABLE 1-continued

| | | | | |
|---|---|---|---|---|
| | | | the ferrostannous bath solution as a flux | chromium and 8 mg/m² hydrated chromium oxide |
| Example 4 | 0.5μ thick Ni—20% Sn alloy | 0.7μ | 260° C. for 0.5 sec. in nitrogen gas atmosphere using the same flux as above | 6.2 mg/m² hydrated chromium oxide |
| Example 5 | 0.005μ thick Ni | 0.40μ | — | 10 mg/m² metallic chromium and 15 mg/m² hydrated chromium oxide |
| Example 6 | 0.2μ thick Ni—20% Co alloy | 0.40μ | 240° C. for 1.5 sec. using an aqueous solution of phytic acid containing $Sn^{2+}$ as a flux | 15 mg/m² metallic chromium and 10 mg/m² hydrated chromium oxide |
| Example 7 | 0.1μ thick Ni with 90 sec. of diffusion at 750° C. | 0.10μ | Same as in Example 3 | Same as in Example 3 |
| Example 8 | 0.002μ thick Ni—17% P alloy | 0.15μ | — | Same as in Example 2 |
| Example 9 | 0.2μ thick 40% Ni—Fe alloy with 30 sec. of diffusion at 800° C. | 0.25μ | 250° C. for 0.8 sec. in a mixed gas atmosphere using rosin alcohol as a flux | 7.5 mg/m² metallic chromium and mg/m² hydrated chromium oxide |
| Example 10 | 0.06μ thick Ni—40% Co 20 sec. of diffusion at 820° C. | 0.12μ | Same as in Example 4 | 20 mg/m² metallic chromium and 26 mg/m² hydrated chromium oxide |
| Example 11 | 1.1μ thick Ni—10% Co alloy | 0.32μ | Same as in Example 6 | 3.0 mg/m² hydrated chromium oxide |
| Example 12 | 0.007μ thick Ni | 0.4μ | — | Same as in Example 1 |
| Example 13 | 0.05μ thick Ni | 0.15μ | — | 4.5 mg/m² hydrated chromium oxide |
| Example 14 | 0.06μ thick Ni with 30 sec. of diffusion at 780° C. | 0.12μ | — | 2 mg/m² metallic chromium and 5 mg/m² hydrated chromium oxide |
| Example 15 | 0.1μ thick 20% Ni—Fe alloy | 0.3μ | 240° C. for 1 sec. using a dilution of the ferrostannous bath solution as a flux | 4.5 mg/m² metallic chromium and 10 mg/m² hydrated chromium oxide |
| Example 16 | 0.02μ thick Ni—20% Sn alloy | 0.7μ | 250° C. for 0.5 sec. in nitrogen gas atmosphere using the same flux as Example 15 | 4.5 mg/m² hydrated chromium oxide |
| Example 17 | 0.005μ thick Ni | 0.40μ | — | 8 mg/m² metallic chromium and 15 mg/m² hydrated chromium oxide |
| Example 18 | 0.1μ thick Ni—30% Co alloy | 0.40μ | 240° C. for 1.5 sec. using an aqueous solution of phytic acid containing $Sn^{+2}$ as a flux | 10 mg/m² metallic chromium and 10 mg/m² hydrated chromium oxide |
| Comparative Example 1 | 0.1μ thick Ni | 0.15μ | — | Same as in Example 1 |
| Comparative Example 2 | — | 0.40μ | Same as in Example 3 | Same as in Example 2 |
| Comparative Example 3 | — | 0.30μ | Same as in Example 4 | Same as in Example 3 |
| Comparative Example 4 | — | 0.10μ | Same as in Example 6 | Same as in Example 4 |
| Comparative Example 5 | — | 0.40μ | — | Same as in Example 11 |
| Comparative Example 6 | — | — | — | — |
| Comparative Example 7 | — | — | — | — |

TABLE 2

Test results obtained in EXAMPLE I

| | ① Corrosion resistance of a defective coating portion | | ② Corrosion resistance of a defective coating portion | | ③ Edge rusting | | ④ Paint application | | ⑤ Tests in a score portion on the lid of a can | | ⑥ Work-ability |
|---|---|---|---|---|---|---|---|---|---|---|---|
| | (a) Dissolution of Fe | (b) Perforative corrosion | (a) Dissolution of Fe | (b) Perforative corrosion | (a) Cycle test | (b) Outdoor exposure | (a) Paint adhesion | (b) Corrosion resistance at the scratch | (a) Paint adhesion | (b) Perforative corrosion | |
| Example 1 | ○ | ○ | ○ | ○ | ○~△ | ○~△ | ○~△ | ◉~○ | ◉~○ | ○ | ○ |
| Example 2 | ○ | ○ | ○ | ○ | ○~△ | ○~△ | ◉~○ | ◉~○ | ◉~○ | ○ | ◉ |
| Example 3 | ○ | ◉~○ | ◉~○ | ◉~○ | ○ | ○ | ◉ | ◉ | ◉ | ○ | ◉ |
| Example 4 | ○ | ◉~○ | ◉~○ | ◉~○ | ○ | ○ | ◉ | ◉ | ◉ | ○ | ◉ |
| Example 5 | ◉ | ◉ | ◉ | ◉ | ◉ | ◉~○ | ◉~○ | ◉ | ◉ | ◉~○ | ◉ |
| Example 6 | ◉ | ◉ | ◉ | ◉ | ◉ | ◉~○ | ◉ | ◉ | ◉ | ◉ | ◉ |
| Example 7 | ◉ | ◉ | ◉ | ◉ | ◉ | ◉ | ◉ | ◉ | ◉ | ◉ | ○ |
| Example 8 | ◉ | ◉ | ◉ | ◉ | ◉ | ◉ | ◉ | ◉~○ | ◉~○ | ◉ | ◉ |
| Example 9 | ◉ | ◉ | ◉ | ◉ | ◉ | ◉ | ◉ | ◉ | ◉ | ◉ | ◉ |
| Example 10 | ◉ | ◉ | ◉ | ◉ | ◉ | ◉ | ◉ | ◉ | ◉ | ◉ | ◉ |
| Example 11 | ◉ | ◉ | ◉ | ◉ | ◉ | ◉ | ◉ | ◉ | ○~△ | ◉ | ◉ |
| Example 12 | ◉ | ◉ | ◉ | ◉ | ◉ | ◉ | ◉ | ◉ | ○~△ | ◉ | ◉ |
| Example 13 | ◉ | ◉ | ◉ | ◉ | ◉ | ◉ | ◉ | ◉ | ○ | ◉ | ◉ |
| Example 14 | ◉ | ◉ | ◉ | ◉ | ◉ | ◉ | ◉ | ◉ | ◉~○ | ◉ | ◉ |
| Example 15 | ◉ | ◉ | ◉ | ◉ | ◉ | ◉ | ◉ | ◉ | ◉ | ◉ | ○ |
| Example 16 | ◉ | ◉ | ◉ | ◉ | ◉ | ◉ | ◉ | ◉ | ◉ | ◉ | ○ |

TABLE 2-continued

Test results obtained in EXAMPLE I

| | ① Corrosion resistance of a defective coating portion | | ② Corrosion resistance of a defective coating portion | | ③ Edge rusting | | ④ Paint application | | ⑤ Tests in a score portion on the lid of a can | | ⑥ Work-ability |
|---|---|---|---|---|---|---|---|---|---|---|---|
| | (a) Dissolution of Fe | (b) Perforative corrosion | (a) Dissolution of Fe | (b) Perforative corrosion | (a) Cycle test | (b) Outdoor exposure | (a) Paint adhesion | (b) Corrosion resistance at the scratch | (a) Paint adhesion | (b) Perforative corrosion | |
| Example 17 | ⊚ | ⊚ | ⊚ | ⊚ | ⊚ | ⊙ | ⊚ | ⊚ | ⊚ | ⊚ | ○ |
| Example 18 | ⊚ | ⊚ | ⊚ | ⊚ | ⊚ | ⊚ | ⊚ | ⊚ | ⊚ | ⊚ | ○ |
| Comparative Example 1 | Δ~X | Δ~X | Δ~X | Δ~X | X | X | Δ | Δ | Δ | X | ⊚ |
| Comparative Example 2 | X | X | X | X | X | X | Δ | Δ | ~Δ | X | ⊚ |
| Comparative Example 3 | X | X | X | X | X | X | Δ | Δ | Δ | X | ⊚ |
| Comparative Example 4 | X | X | X | Δ | X | X | ○ | ○ | ○~Δ | Δ | ⊚ |
| Comparative Example 5 | Δ | Δ | X | X | Δ | X | X | X | X | X | ○ |
| Comparative Example 6 | X | X | X | X | X | X | X | X | X | X | Δ |
| Comparative Example 7 | X | Δ | X | ○~Δ | X | Δ | X | X | X | Δ | X |

EXAMPLE II

Each of the steels shown in TABLE 1 was degreased and pickled in a customary way. Then, it was coated with an undercoating layer of nickel or a nickel alloy and a layer of tin, as shown in TABLE 3. Some of the samples were thereafter subjected to hot melt treatment, as shown in TABLE 3. Chromate treatment was also done on some of the samples. Corrosion resistance tests were conducted on each sample by using a fuel containing alcohol. The test results are shown in TABLE 4. For comparison purposes, the corrosion resistance test were also conducted on, for examples, tinplate sheets prepared from aluminum-killed and titanium-killed steels not containing chromium, etc.

The following tests were conducted:

(1) Tests Simulating the Outer Surface of a Fuel Tank:

(A) Salt spray test

A 100 mm by 300 mm test specimen was prepared from each tinplate and formed with 300 meshes each measuring 10 mm square. The specimen was subjected to 48 hours of a salt spray test and the number of the meshes in which rust had appeared was counted. Each of the symbols used in TABLE 4 to show the test results indicates the ratio of the meshes in which rust appeared, to the total number of the meshes:

⊙: Less than 5%;
○: 5% to less than 25%;
Δ: 25% to less than 50%;
x: 50% or more.

(B) Cycle corrosion test

A 0.8 mm thick test specimen was prepared from each tinplate and subjected to 60 test cycles each consisting of (a) four hours of 5% NaCl spray at 35° C., (b) two hours of drying at a temperature of 70° C. and a humidity of 60%, (c) two hours of moistening at a temperature of 49° C. and a humidity of 98% and (d) two hours of cooling at a temperature of −20° C. The specimen was examined for thickness reduction due to rusting and corrosion. Each of the symbols used in TABLE 4 to show the test results indicates the amount of such thickness reduction:

⊙: Less than 0.25 mm;
○: 0.25 mm to less than 0.45 mm;
Δ: 0.45 mm to less than 0.75 mm;
x: 0.75 mm or more.

(C) Cycle corrosion test

A test specimen measuring 0.8 mm by 100 mm by 150 mm was prepared from each tinplate. Alundum particles having a diameter of 1 to 2 mm were caused to strike against the coated surface of the test specimen at a pressure of 1 kg/cm$^2$ for 10 seconds in a quantity of 1.5 g per cm$^2$ of the specimen surface for chipping it. Then, it was subjected to 45 cycles of the cycle corrosion test described at (B) above and examined for thickness reduction. The results are shown in TABLE 4 by the same symbols as those used to show the results of the cycle corrosion test described at (B).

(2) Tests Simulating the Inner Surface of a Fuel Tank:

A cylindrical tank having a diameter of 75 mm and a height of 40 mm was prepared from a blank having a wall thickness of 0.8 mm and a diameter of 150 mm by employing a 75 mm dia. punch and applying a squeezing pressure of one ton. It was filled with 100 cc of alcoholic fuel, as will hereinafter be described in detail, and closed. The following tests were conducted.

(D) Gasohole test

The test was continued for three months by using a corrosive solution containing 20% (vol%) of ethanol, 0.03% (vol%) of acetic acid and 0.15% (vol%) of a 1% aqueous solution of NaCl, the balance being gasoline.

(E) Gasohole test

Another gasohole test was continued for three months by using a corrosive solution containing 70% (vol%) of methanol, 10% of isopropyl alcohol, 0.03% (vol%) of formic acid and 0.3% (vol%) of a 1.2% aqueous solution of NaCl, the balance being gasoline.

(F) 100% alcohol test

The test was continued for three months by using a solution consisting of 99% (vol%) of methanol, 0.01% (vol%) of formic acid and 0.99% (vol%) of a 0.5% aqueous solution of NaCl.

After each of the tests (D) to (F), the number of rusty spots was counted on those portions of each tank which had been in contact with the solution and its vapor. Each of the symbols used in TABLE 4 represents the number of the rusty spots:

⊙ : 0 to 3;
○ : Over 3 to 10;
Δ: Over 10 to 20;
x: 21 or more.

(G) Gasohole test on a welded seam

The edges of a 0.8 mm thick tinplate sheet were overlapped on each other and seam welded to each other as shown at 1 in FIG. 6. A trapezoidal electrode having a width of 4 mm was used for welding by employing a pressure of 400 kg.f, a welding speed of 2.5 m/min. and a welding time of 2-2∞. The tank thereby made was filled with a testing solution as shown at 2 in FIG. 6 and closed by a plastic cover. The solution contained 80% of methanol, 5% of isopropyl alcohol, 0.01% of formic acid and 0.3% of a 0.1% aqueous solution of NaCl, the balance being gasoline. After three months had passed, the tank was examined for rusting on its bottom and cylindrical surfaces. Each of the symbols appearing in TABLE 4 represents the degree of rusting:

⊙ : Less than 5%;
○: 5% to less than 10%;
Δ: 10% to less than 20%;
x: 20% or more.

(H) Gasoline test

The test was continued for three months by using a corrosion accelerating solution containing 70% (vol%) of gasoline and 30% (vol%) of a 1% aqueous solution of NaCl. The results are shown in TABLE 4 by the same symbols as those used to show the results of the tests (D) to (F).

(I) Solderability

Each tinplate was examined for solderability to a layer of a Sn—Zn alloy containing about 80 to 90% of tin and usually applied to a pipe for a fuel tank. Soldering was carried out by using 60% Sn-40% Pb solder and a $ZnCl_2$—HCl flux. Examination was made of the solderability between the surface of the Sn—Zn alloy layer and the tin layer on the tinplate and the strength of the soldered joint. Each of the symbols used in TABLE 4 represents the overall evaluation of solderability and joint strength:

⊙ : Very good;
○ : Relatively good;
Δ : Relatively poor;
x: Very poor.

(J) Workability

A 0.8 mm thick, 500 mm square blank was formed into a square cylinder by employing a 150 mm square punch at a squeezing pressure of 30 tons after a lubricant had been applied thereto. Each product was examined for the depth of squeezing and the appearance of scratches on its outer coated surface. Each of the symbols appearing in TABLE 4 represents the degree of workability:

⊙ : Very good without any scratch formed on the coated surface;
○ : Considerably good without any scratch formed;
Δ: Some scratches depending on the degree of work;
x: Very poor.

TABLE 3

Treatment employed for making tinplate in EXAMPLE II

| | [Undercoating] | [Tin layer thickness] | [Hot melt treatment] | [Chromate treatment] |
|---|---|---|---|---|
| Example 1 | 0.05μ thick Ni | 1.2μ | — | 4.5 mg/m² hydrated chromium oxide |
| Example 2 | 0.1μ thick Ni—20% Co alloy | 1.5μ | 245° C. for 0.6 sec. using a dilution of the ferrostannous bath solution as a flux | — |
| Example 3 | 0.2μ thick Ni with 45 sec. of diffusion at 790° C. | 3.1μ | 250° C. for 1 sec. using a dilution of the ferrostannous bath solution as a flux | — |
| Example 4 | 0.15μ thick Ni—30% Sn alloy | 2.0μ | 260° C. for 0.7 sec. using an aqueous solution of phytic acid containing $Sn^{2+}$ as a flux | 1.1 mg/m² metallic chromium and 6.7 mg/m² hydrated chromium oxide |
| Example 5 | 0.12μ thick Ni | 3.5μ melt coating | — | 6.3 mg/m² metallic chromium and 4.5 mg/m² hydrated chromium oxide |
| Example 6 | 0.06μ thick 30% Ni—Fe alloy with 60 sec. of diffusion at 760° C. | 6.0μ | 260° C. for 1.2 sec. using an aqueous $ZnCl_2$ solution as a flux | 2.5 mg/m² P |
| Example 7 | 0.04μ thick Ni—25% P alloy | 1.5μ | 250° C. for 1 sec. in nitrogen gas atmosphere using the same flux as in Example 3 | — |
| Example 8 | 1.0μ thick Ni—50% Co alloy with 120 sec. of diffusion at 850° C. | 5.2μ melt coating | — | 3.2 mg/m² hydrated chromium oxide |
| Example 9 | 0.08μ thick Ni | 4.1μ | 260° C. for 0.7 sec. in a mixed gas atmosphere using the same flux as in Example 4 | 2 mg/m² metallic chromium and 12.5 mg/m² hydrated chromium oxide |
| Example 10 | 0.1μ thick Ni with 30 sec. of diffusion at 750° C. | 2.8μ | 240° C. for 2.5 sec. using rosin alcohol as a flux | Same as in Example 1 |
| Example 11 | 0.25μ thick Ni—30% Co alloy | Same as in Example 3 | Same as in Example 3 | 1.2 mg/m²P |
| Example 12 | Same as in Example 1 | Same as in Example 1 | — | — |
| Example 13 | 0.05μ thick Ni | 1.8μ | Same as in Example 2 | 4.5 mg/m² hydrated chromium oxide |
| Example 14 | 0.1μ thick Ni—20% Co alloy | 4.1μ | — | — |
| Example 15 | 0.2μ thick Ni with 45 sec. of diffusion at 790° C. | 2.2μ | 240° C. for 1 sec. using a dilution of the ferrostannous bath solution as a flux | 1.6 mg/m² P |
| Example 16 | 0.10μ thick Ni—20% Sn alloy | 2.5μ | 250° C. for 0.7 sec. using an aqueous solution of phytic acid containing $Sn^{+2}$ as a flux | 1.1 mg/m² metallic chromium and 8.7 mg/m² hydrated chromium oxide |
| Example 17 | 0.12μ thick Ni | 4.5μ melt coating | — | 3.3 mg/m² metallic chromium and 4.5 mg/m² |

TABLE 3-continued

Treatment employed for making tinplate in EXAMPLE II

| | [Undercoating] | [Tin layer thickness] | [Hot melt treatment] | [Chromate treatment] |
|---|---|---|---|---|
| Example 18 | 0.06μ thick 30% Ni—Fe alloy with 60 sec. of diffusion at 760° C. | 5.5μ | 260° C. for 1.2 sec. using an aqueous $ZnCl_2$ solution as a flux | hydrated chromium oxide 1.1 mg/m² P |
| Comparative Example 1 | — | Same as in Example 3 | Same as in Example 3 | — |
| Comparative Example 2 | Same as in Example 1 | Same as in Example 3 | — | Same as in Example 1 |
| Comparative Example 3 | — | Same as in Example 5 | — | Same as in Example 5 |
| Comparative Example 4 | — | Same as in Example 2 | Same as in Example 4 | — |
| Comparative Example 5 | — | Same as in Example 2 | — | Same as in Example 6 |
| Comparative Example 6 | — | — | — | — |
| Comparative Example 7 | — | — | — | — |

TABLE 4

Test results obtained in EXAMPLE II

| | Tests simulating the outer surface of a fuel tank | | | Tests simulating the inner surface of a fuel tank | | | | | (I) Solderability | (J) Workability |
|---|---|---|---|---|---|---|---|---|---|---|
| | (A) Salt spray test | (B) Cycle corrosion test | (C) Cycle corrosion test | (D) Gasohole test | (E) Gasohole test | (F) 100% alcohol test | (G) Gasohole test on a welded seam | (H) Gasoline test | | |
| Example 1 | ○ | ○ | ○ | ○~Δ | ○ | ⊚~○ | ○ | ○ | ⊚ | ○ |
| Example 2 | ○ | ○ | ○ | ○ | ○ | ⊚~○ | ○ | ○ | ⊚ | ⊚ |
| Example 3 | ○ | ○ | ○ | ○ | ⊚~○ | ⊚ | ⊚~○ | ○ | ⊚ | ⊚ |
| Example 4 | ○ | ⊚~○ | ⊚~○ | ○ | ⊚~○ | ⊚ | ⊚ | ○ | ⊚ | ○ |
| Example 5 | ⊚ | ○ | ○ | ○~Δ | ○ | ⊚ | ⊚~○ | ○ | ⊚ | ⊚ |
| Example 6 | ⊚ | ⊚ | ⊚~○ | ⊚ | ⊚ | ⊚ | ⊚ | ⊚ | ⊚ | ⊚ |
| Example 7 | ⊚ | ⊚~○ | ⊚~○ | ⊚ | ⊚ | ⊚ | ⊚ | ⊚ | ⊚ | ○ |
| Example 8 | ⊚ | ⊚~○ | ⊚~○ | ○ | ⊚~○ | ⊚ | ⊚~○ | ⊚~○ | ⊚ | ⊚ |
| Example 9 | ⊚ | ⊚ | ⊚ | ⊚ | ⊚ | ⊚ | ⊚ | ⊚ | ⊚ | ⊚ |
| Example 10 | ⊚ | ⊚~○ | ⊚~○ | ⊚ | ⊚ | ⊚ | ⊚ | ⊚ | ⊚ | ⊚ |
| Example 11 | ⊚ | ⊚ | ⊚ | ⊚ | ⊚ | ⊚ | ⊚ | ⊚ | ⊚ | ⊚ |
| Example 12 | ⊚ | ⊚ | ⊚ | ○ | ⊚~○ | ⊚ | ⊚~○ | ⊚~○ | ⊚ | ⊚ |
| Example 13 | ⊚ | ⊚ | ⊚ | ⊚ | ⊚ | ⊚ | ⊚ | ⊚ | ⊚ | ⊚ |
| Example 14 | ⊚ | ⊚ | ⊚ | ○ | ⊚~○ | ⊚ | ⊚ | ⊚ | ⊚ | ⊚ |
| Example 15 | ⊚ | ⊚ | ⊚ | ⊚ | ⊚ | ⊚ | ⊚ | ⊚ | ⊚ | ○ |
| Example 16 | ⊚ | ⊚ | ⊚ | ⊚ | ⊚ | ⊚ | ⊚ | ⊚ | ⊚ | ○ |
| Example 17 | ⊚ | ⊚ | ⊚ | ⊚ | ⊚ | ⊚ | ⊚ | ⊚ | ⊚ | ○ |
| Example 18 | ⊚ | ⊚ | ⊚ | ⊚ | ⊚ | ⊚ | ⊚ | ⊚ | ⊚ | ○ |
| Comparative Example 1 | X | X | X | X | X | X | Δ~X | X | ⊚ | ⊚ |
| Comparative Example 2 | X | X | X | X | X | X | Δ~X | X | ⊚ | ⊚ |
| Comparative Example 3 | X | X | X | X | X | X | Δ~X | X | ⊚ | ⊚ |
| Comparative Example 4 | Δ | ○~Δ | ○~Δ | Δ~X | Δ | Δ | Δ | Δ | ⊚ | ⊚ |
| Comparative Example 5 | ○~Δ | ○ | ○ | Δ | ○~Δ | ○~Δ | Δ | Δ | ⊚ | ○ |
| Comparative Example 6 | X | Δ | X | X | X | X | X | X | X | Δ |
| Comparative Example 7 | X | Δ | Δ | X | Δ~X | Δ | X | X | X | X |

What is claimed is:

1. A coated steel sheet of high corrosion resistance consisting essentially of:
   a sheet of steel consisting essentially of up to and including 0.1% by weight of carbon, 0.005 to 0.08% by weight of soluble aluminum and 0.1 to 20% by weight of chromium, the balance being essentially iron;
   a first coating layer electroplated on at least one surface of said steel from a material selected from nickel and a nickel alloy, and having a thickness of 0.001 to 1.5 microns; and
   a second coating layer of tin electroplated on said first coating layer and having a thickness of at least 0.05 microns.

2. A coated steel sheet as set forth in claim 1, wherein said steel further contains a total of 0.03 to 0.5% by weight of at least one of titanium, niobium, zirconium and vanadium.

3. A coated steel sheet as set forth in claim 1, wherein said steel further contains up to and including 3.0% by weight of nickel.

4. A coated steel sheet as set forth in claim 1, wherein said steel further contains a total of 0.03 to 0.5% by weight of at least one of titanium, niobium, zirconium and vanadium and up to and including 3.0% by weight of nickel.

5. A coated steel sheet as set forth in any one of claims 1 to 4, wherein said steel contains 0.003 to 0.1% by weight of carbon, 0.03 to 0.07% by weight of soluble aluminum and 2 to 11% by weight of chromium.

6. A coated steel sheet as set forth in any one of claims 1 to 4, wherein said second coating layer has a thickness of 0.1 to 1.5 microns.

7. A coated steel sheet as set forth in any one of claims 1 to 4, wherein said second coating layer has a thickness of 1 to 10 microns.

8. A coated steel sheet as set forth in claim 1, wherein said second coating layer is a layer subjected to hot melt treatment after it has been formed.

9. A coated steel sheet as set forth in claim 8, wherein said steel further contains a total of 0.03 to 0.5% by weight of at least one of titanium, niobium, zirconium and vanadium.

10. A coated steel sheet as set forth in claim 8, wherein said steel further contains up to and including 3.0% by weight of nickel.

11. A coated steel sheet as set forth in claim 8, wherein said steel further contains a total of 0.03 to 0.5% by weight of at least one of titanium, niobium, zirconium and vanadium and up to and including 3.0% by weight of nickel.

12. A coated steel sheet as set forth in any one of claims 8 to 11, wherein said steel contains 0.003 to 0.1% by weight of carbon, 0.03 to 0.7% by weight of soluble aluminum and 2 to 11% by weight of chromium.

13. A coated steel sheet as set forth in any one of claims 8 to 11, wherein said second coating layer has a thickness of 0.1 to 1.5 microns.

14. A coated steel sheet as set forth in any one of claims 8 to 11, wherein said second coating layer has a thickness of 1 to 10 microns.

* * * * *